(12) United States Patent
Shimamura et al.

(10) Patent No.: US 6,781,345 B2
(45) Date of Patent: Aug. 24, 2004

(54) BATTERY MODULE

(75) Inventors: Osamu Shimamura, Kanagawa-ken (JP); Hideaki Horie, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 22 days.

(21) Appl. No.: 10/357,210

(22) Filed: Feb. 4, 2003

(65) Prior Publication Data

US 2003/0151388 A1 Aug. 14, 2003

(30) Foreign Application Priority Data

Feb. 13, 2002 (JP) ..................................... P2002-034928

(51) Int. Cl.[7] .................................................. H02J 7/00
(52) U.S. Cl. ....................................... 320/107; 320/112
(58) Field of Search ................................. 320/107, 112, 320/110, 108; 429/96, 97, 98, 99, 100; 307/150

(56) References Cited

U.S. PATENT DOCUMENTS 5,057,385 A    10/1991  Hope, deceased et al. .. 424/162
6,225,778 B1 *  5/2001  Hayama et al. ............. 320/112
6,531,246 B2 *  3/2003  Hanafusa et al. ........... 429/162

FOREIGN PATENT DOCUMENTS

| EP | 1 160 892    | 12/2001 |
| JP | 11-224652    | 8/1999  |
| JP | 2000-306556  | 11/2000 |
| WO | WO 01/57941  | 8/2001  |

* cited by examiner

*Primary Examiner*—Lawrence Luk
(74) *Attorney, Agent, or Firm*—McDermott Will & Emery LLP

(57) ABSTRACT

A battery module comprises a flat cell including a laminate film; an electric power generating element; lead terminals; a cell outer case junction part formed by partially or completely covering the electric power generating element with the laminate film, and by sealing the laminate film by thermal fusion; a cell assembly formed by collecting a plurality of the flat cells; and a pair of planar supports for interposing the cell assembly. Further, the battery module comprises rib-shaped protrusions respectively including electrical conductors for electrically connecting the lead terminals of the flat cells, the rib-shaped protrusions being held on the planar support at predetermined intervals, and the planar supports pressing and supporting the cell assembly.

5 Claims, 6 Drawing Sheets

BATTERY MODULE

BACKGROUND OF THE INVENTION

1. Field of the Invention

The present invention relates to a module structure using flat cells, each flat cell having a structure in which a laminate film of polymer-metal composite is used as a cell outer case and in which a periphery of the cell outer case is joined by thermal fusion to house and seal an electric power generating element formed by stacking or winding a positive electrode plate, a separator and a negative electrode plate.

2. Description of the Related Art

Recently, the air pollution caused by an exhaust gas from vehicles has become a global problem. In such a context, electric vehicles, which use an electric power as a motive power source, and hybrid cars, which are run by the combination of an engine and a motor, have been attracting attention. Correspondingly, the development of a battery having a high energy density and a high output density to be mounted on these hybrid cars has an important place industrially. As a configuration of a battery for such use, there is a configuration in which a wound electric power generating element is housed within a cylindrical case. In another configuration, a wound electric power generating element or an electric power generating element, which stacks planar electrodes and a separator, is housed within a flat case.

Since these cylindrical or flat cases are required to have enhanced strength, it is necessary to form these cases as metal cans. Therefore, there is a problem that the reduction of weight is difficult. Thus, as means of reducing the weight of a battery as well as obtaining a higher energy density and a higher output, the prior art as described in Japanese Patent Application Laid-Open No. 11-224652 (1999) is cited. In this conventional technology, a structure of a battery using a laminate film as an outer case, a periphery of which is sealed by thermal fusion to close the outer case hermetically, has been proposed.

SUMMARY OF THE INVENTION

However in such a battery using a laminate sheet as a cell outer case, because the laminate film has poor rigidity, the application of an external force easily deforms the battery. Excessive deformation resulting from the external force breaks the internal structure of the battery, causing internal short-circuiting. Moreover, the thermally fused portion of the outer periphery of the battery is particularly easily deformed. Therefore, there is a possibility that the sealability may be impaired by the deformation due to the application of an external force or an increase in internal pressure due to an increase in the temperature of the battery.

Furthermore, since the battery using a laminate film as an outer case is inferior to that using a metal can from the view point of the ability to compress the electric power generating element housed within the battery case, a distance between a positive electrode plate and a negative electrode plate becomes uneven, making it difficult to exert the electric power generating ability. Therefore, it is necessary to equalize a distance between the positive electrode plate and the negative electrode plate by some means.

Thus, as a measure against such deformation of the battery, in particular, deformation of the outer periphery of the battery, Japanese Patent Application Laid-Open No. 2000-306556 discloses a battery in which a frame is attached to an outer periphery of the battery. In this conventional technology, with regard to deformation, the outer periphery of the battery can be maintained reliably. However, since the frame is adhered only to the outer periphery of the battery, a distance between a positive electrode plate and a negative electrode plate may become uneven. As a result, there arises a problem in that the high-current discharge performance cannot be fully exerted when the battery is mounted onto an electric vehicle or a hybrid car.

The present invention has been made in consideration of the above problems. It is an object of the present invention to provide a battery module capable of enhancing the reliability of the sealability of a cell so as to ensure the charge/discharge performance at a high current, in a cell using a laminate film of polymer-metal composite as a cell outer case.

To achieve the object described above, the present invention provides a battery module, comprising: a flat cell comprising: a laminate film constituted by a polymer-metal composite, the laminate film being a cell outer case; an electric power generating element formed by stacking or winding a positive electrode plate, a separator and a negative electrode plate; lead terminals for flowing and receiving current to/from the electric power generating element; a cell outer case junction part formed by partially or completely covering the electric power generating element with the laminate film, and by sealing the laminate film by thermal fusion; a cell assembly formed by collecting a plurality of the flat cells; and a pair of planar supports for interposing the cell assembly from a direction opposed to planes of the flat cells; wherein rib-shaped protrusions respectively including electrical conductors for electrically connecting the lead terminals of a plurality of the flat cells are provided on at least one of the planar supports, the rib-shaped protrusions being held on the planar support at predetermined intervals, and the planar supports pressing and supporting the cell assembly.

BRIEF DESCRIPTION OF THE DRAWINGS

The invention will now be described with reference to the accompany drawings wherein.

DETAILED DESCRIPTION OF THE PREFERRED EMBODIMENTS

Hereinafter, embodiments of a battery module according to the present invention will be described in detail with reference to the accompanying drawings.

(Embodiment 1)

Figure 1:
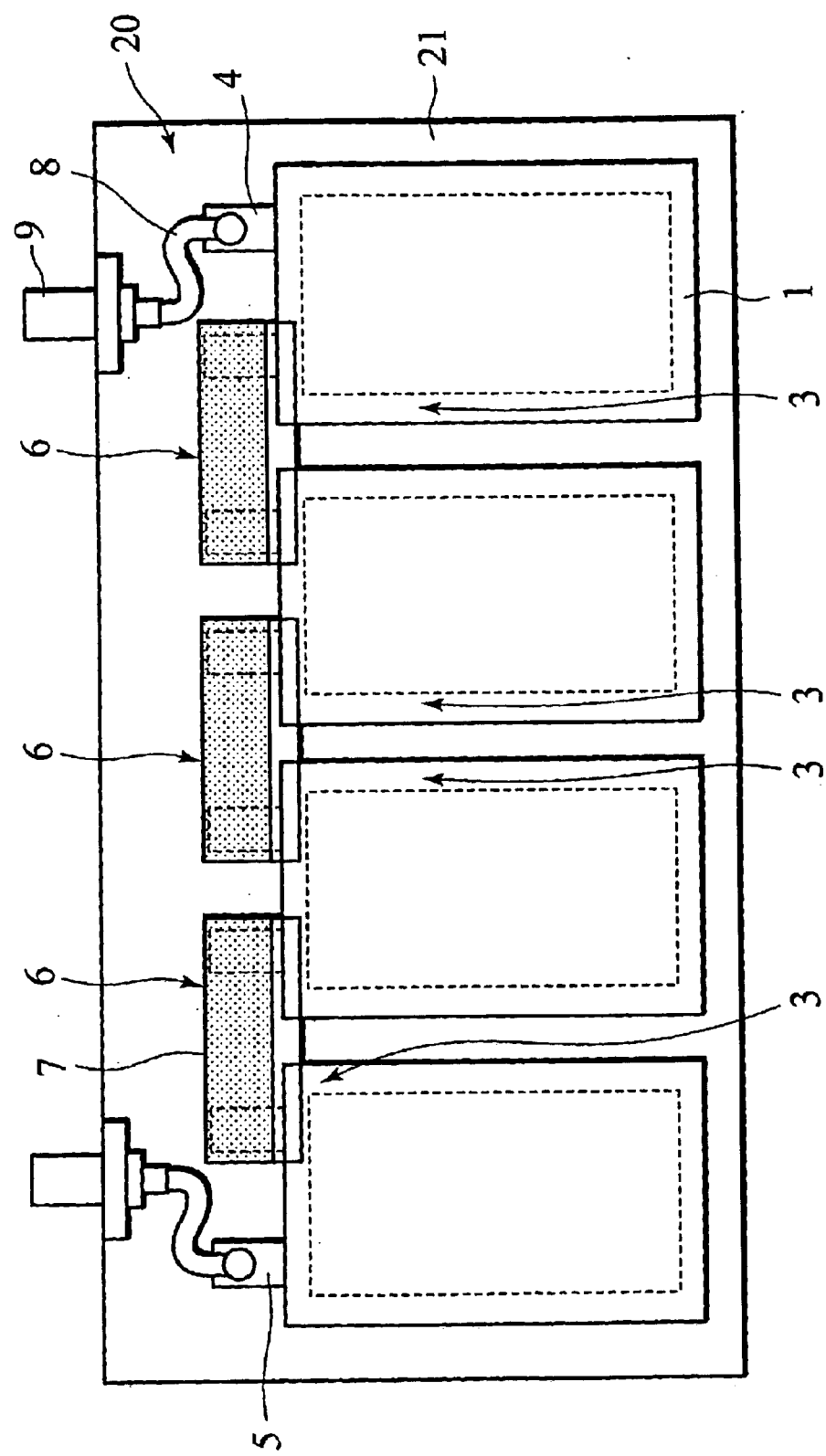
FIG. 1 is a schematic view showing an internal parts of a battery module of Embodiment 1, as viewed from its front side.

As shown in FIG. 1, a battery module 20 interposes and houses four flat cells 1, which are connected in series, between planar supports 21. Although a serial connection is used in Embodiment 1, a parallel connection can also be used.

Figure 2:
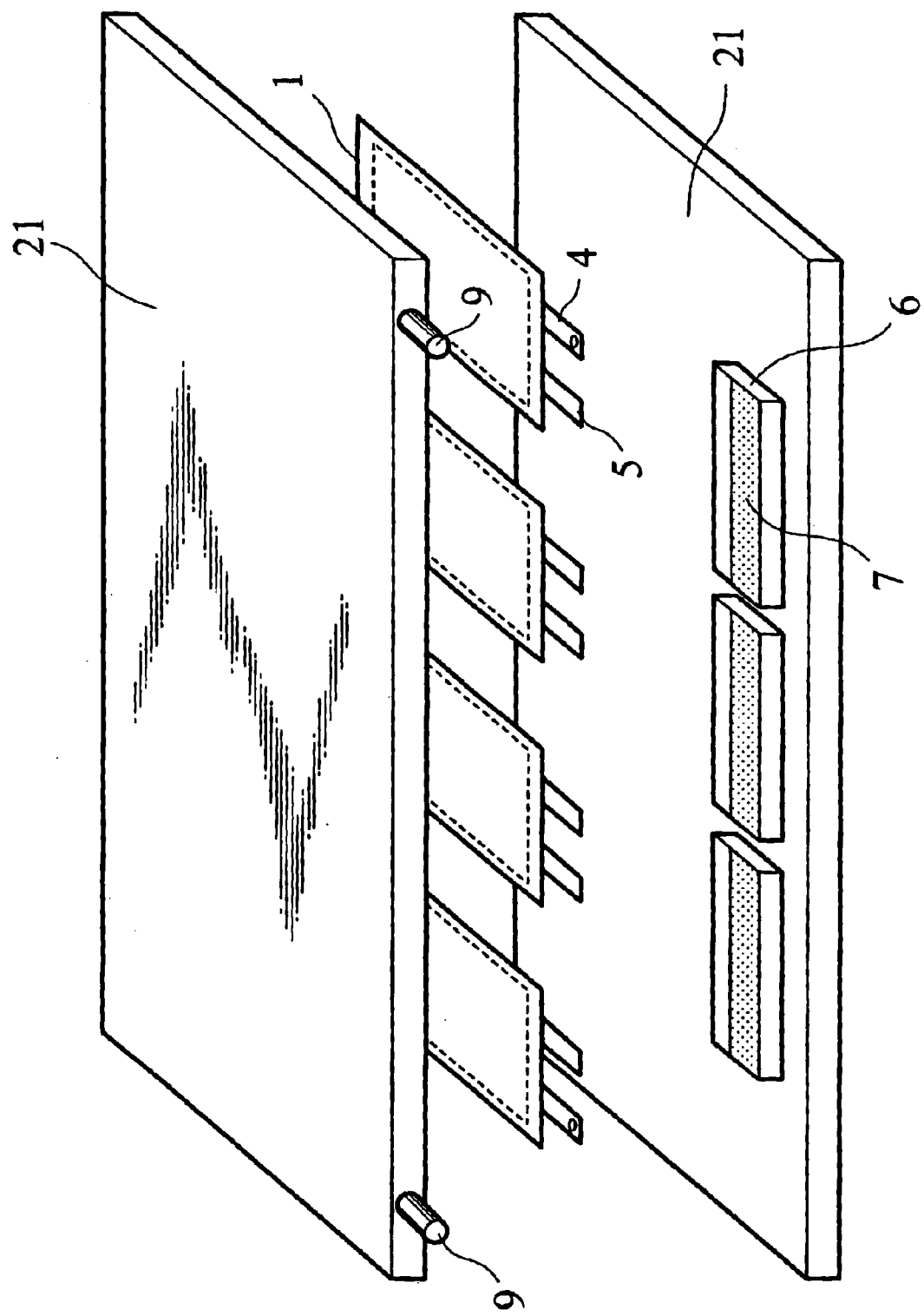
FIG. 2 is a dismantled perspective view showing the battery module of Embodiment 1.

As shown in FIG. 2, rib-shaped protrusions 6 are provided on one planar support 21. On part of each of the rib-shaped protrusions 6, an electrical conductor 7 is provided for connecting electrode lead terminals 4 and 5 of flat cells 1. Through the rib-shaped protrusions 6, the electrode leads 4 and 5 of the flat cells 1 are connected.

Figure 5:
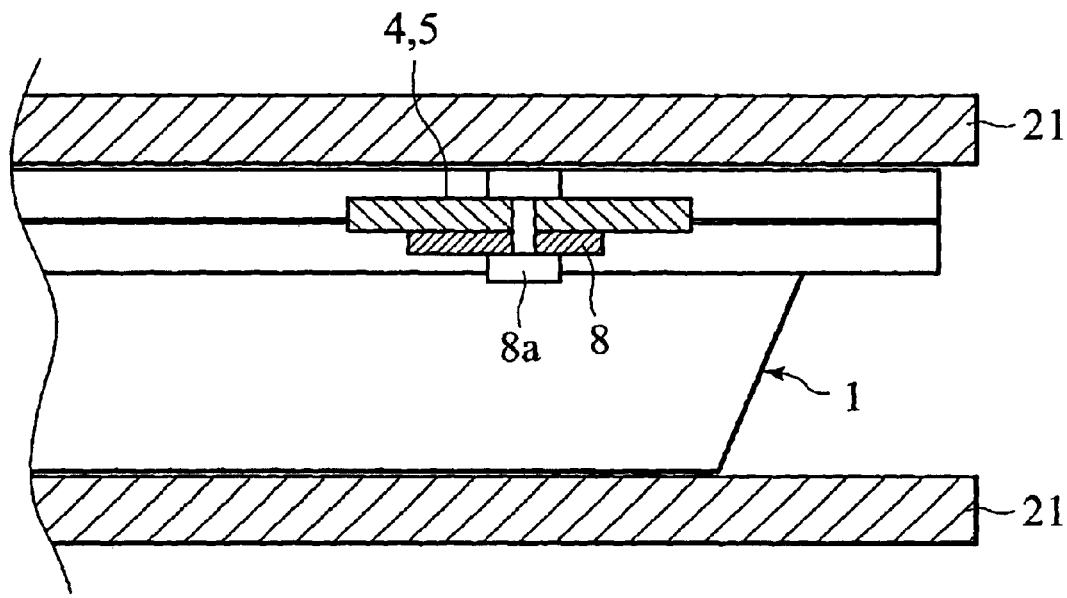
FIG. 5 is an enlarged view showing a vicinity of a junction part between an electrode lead terminal and a lead wire of the battery module according to Embodiment 1.

The electrode lead terminals 4 and 5 positioned on the left and right ends in FIG. 1 are connected to terminals 9 of the battery module 20 through lead wires 8, respectively. As shown in FIG. 5, each of the electrode lead terminals 4 and 5 and the corresponding lead wire 8 are held together by a screw 8a in a sandwiched manner to form a connection with each other.

Next, the flat cell 1 will be described in detail.

Figure 3A:
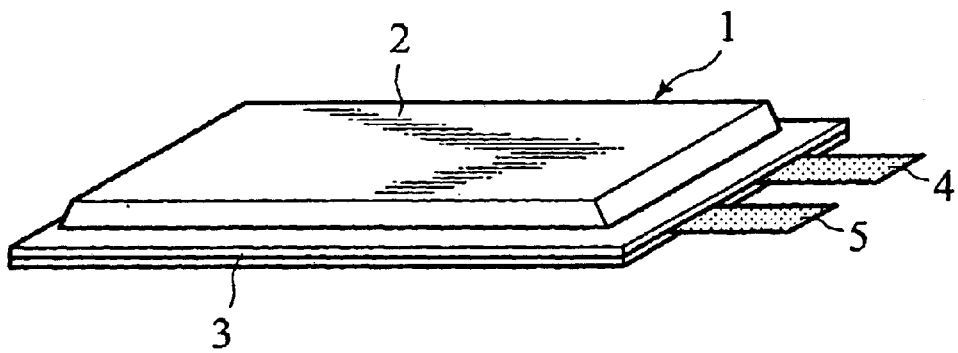
FIGS. 3A and 3B are a perspective view showing a flat cell of Embodiment 1.
Figure 3B:
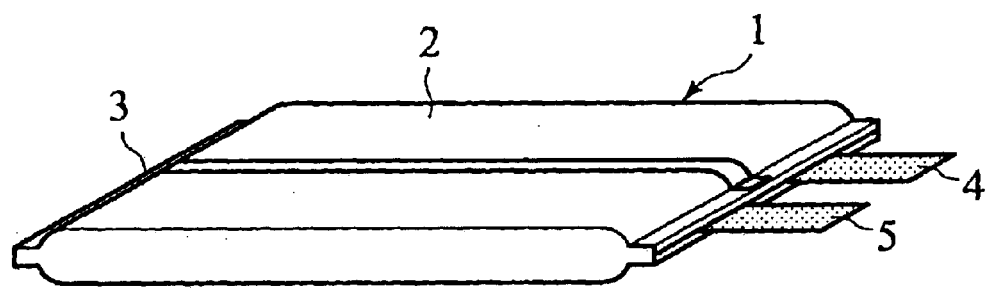

In the flat cell 1, as shown in FIG. 3A, outer case members 2, which are made of a laminate film of polymer-metal composite, are sealed by a thermally fused portion 3 which is formed by joining peripheries of the outer case members 2 by thermal fusion. Alternatively, an opening of the outer case member 2 made of a laminate film having a pouched shape is sealed by the thermally fused portion 3 formed by thermal fusion, as shown in FIG. 3B.

A structure, in which the positive electrode lead terminal 4 and the negative electrode lead terminal 5 extend from the thermally fused portion 3 at one position, is adopted here. However, the number of the positions where the positive and negative electrode lead terminals 4 and 5 extend outward is not particularly limited to one. Moreover, in addition to considerations of strength and processability, when it is considered that a material of the electrode lead terminals 4 and 5 should not cause any reaction other than a battery reaction with a material used for the battery, it is desirable that a principal material of the electrode lead terminals 4 and 5 is selected from the group consisting of aluminum, copper, nickel, stainless steel, iron, gold and silver. However, a material of the electrode lead terminals 4 and 5 is not particularly limited thereto.

Moreover, as electrodes of the flat cell 1, it is desirable to use positive and negative electrodes that are capable of occluding and desorbing lithium ions. For an electrolytic solution, it is desirable to use a separator soaked with a non-aqueous electrolytic solution, a solid or gel electrolyte, or a solid or gel electrolyte containing the separator. It is preferred that a lithium ion cell, a solid or gel electrolyte cell, each using the above-described electrodes and electrolytic solutions, has a structure as shown in FIGS. 3A and 3B.

Moreover, a cathode active material with a base of $LiCoO_2$, $LiMn_2O_4$ or $LiNiO_2$ is preferably used for a positive electrode, whereas it is preferable that a negative electrode with a base of graphite or amorphous hard carbon is used. However, the materials of the positive and negative electrodes are not particularly limited thereto.

Figure 4:
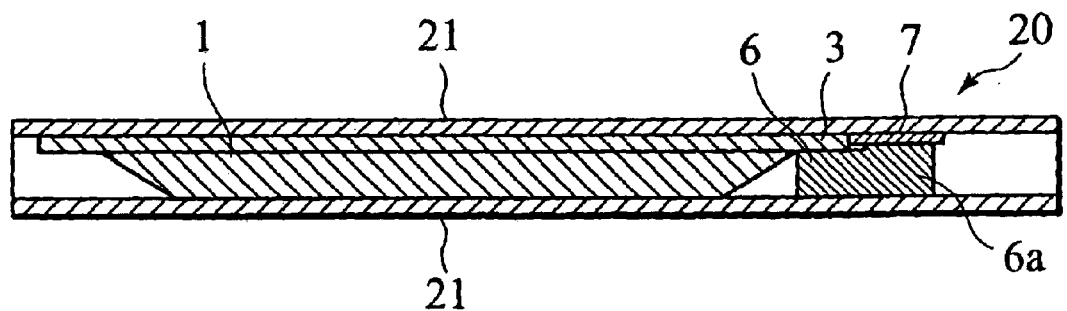
FIG. 4 is a schematic view showing internal parts of the battery module of Embodiment 1, as viewed from its side.
Figure 6:
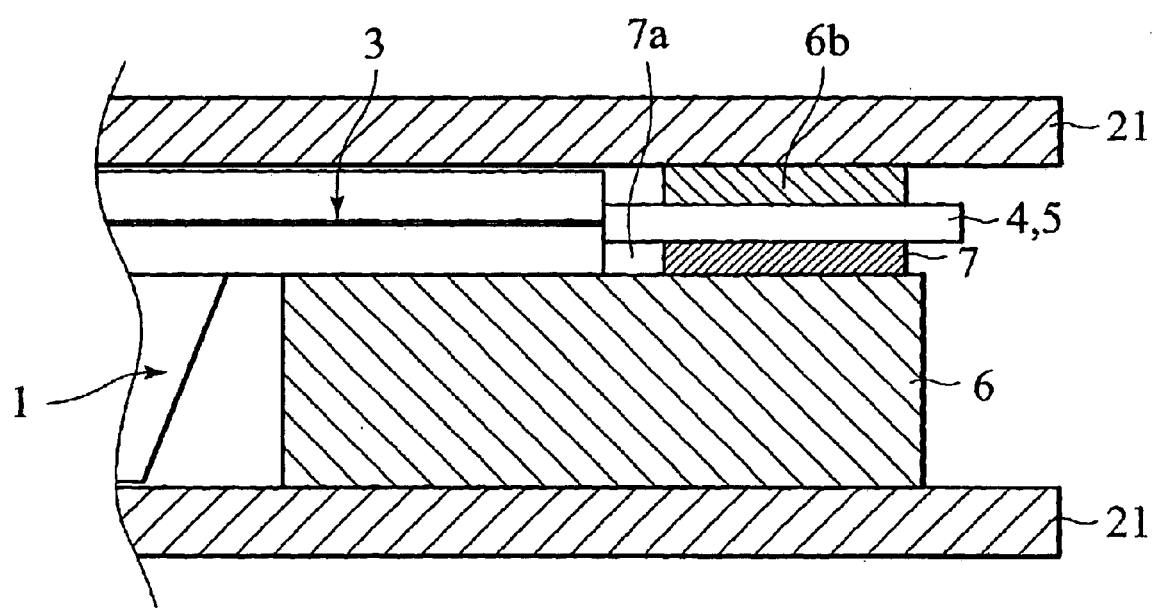
FIG. 6 is a schematic view showing a vicinity of a rib-shaped protrusion of an internal parts of the battery module according to Embodiment 2.

As shown in FIG. 4 and FIG. 6, a predetermined interval 7a is provided between the electrical conductor 7 and the thermally fused portion 3 of the laminate of the cell outer case.

A setting portion 6a of the rib-shaped protrusion 6 for the electrical conductor 7 is formed so as to be projected toward the electrode lead terminals 4 and 5 beyond a portion pressing the thermally fused portion 3.

Next, the functions will be described.

The rib-shaped protrusions 6 are provided on one of the planar supports 21 interposing the assembly of the flat cells 1 therebetween. In particular, a portion of the cell outer case corresponding to the thermally fused portion 3 is interposed therebetween, thus allowing the thermally fused portion 3 to be pressed. As a result, sufficient scalability can be ensured against deformation due to the application of an external force or an increase in the internal pressure due to an increase the in temperature of the battery.

Moreover, the lead terminals 4 and 5 of the plurality of flat cells 1 are electrically connected to each other through the electrical conductors 7 provided on the rib-shaped protrusions 6. As a result, the single cells can be electrically connected without need for a connection means such as a bus bar.

Furthermore, since plane parts of the flat cells 1 are interposed between the planar supports 21 from both sides, deformation of the cells or unevenness in a distance between the positive electrode plate and the negative electrode plate is not caused.

Therefore, the distribution of a current density in charging/discharging can be equalized, thereby ensuring high current charge/discharge.

Furthermore, the presence of the interval 7a enables the prevention of short-circuit outside the cell through a metal foil included in a laminate layer and the electrical conductor 7 on the rib-shaped protrusion 6. Therefore, it is not necessary to perform an extra process in order to prevent short-circuits, on the thermally fused portion 3 of the laminate film of the cell outer case.

In addition, the setting portion 6a of the electrical conductor 7 on the rib-shaped protrusion 6 is formed so as to be projected toward the electrode lead terminal 4 or 5 beyond the portion for pressing the thermally fused portion 3. As a result, it is possible to improve the adhesion between the electrode lead terminals 4 and 5 and the electrical conductor 7, thereby ensuring high current charge/discharge.

(Embodiment 2)

FIG. 6 is an enlarged view showing a junction part between the electrode lead terminal 4 or 5 and the electrical conductor 7 according to Embodiment 2, as viewed from the side. Since the fundamental structure of Embodiment 2 is similar to that of Embodiment 1, only the differences therebetween will be described.

The predetermined interval 7a is provided between the electrical conductor 7 and the thermally fused portion 3 of the laminate film of the cell outer case.

The setting portion 6a is formed in a projected manner on the rib-shaped protrusions 6 in Embodiment 1. However, in Embodiment 2, as shown in FIG. 6, second ribs 6b for pressing the electrode lead terminals 4 and 5 against the electrical conductors 7 are provided on the other planar support 21 at the positions opposing the nib-shaped protrusions 6 having the electrical conductors 7.

Next, the functions will be described.

The presence of the second ribs 6b ensures the contact between the electrode lead terminals 4 and 5 and the electrical conductors 7 even in a cell in which a thickness of the electrode lead terminals 4 and 5 is smaller than the thermally fused portion 3 of the cell. Therefore, a contact resistance can be reduced to allow high current charge/discharge.

(Embodiment 3)

Figure 7:
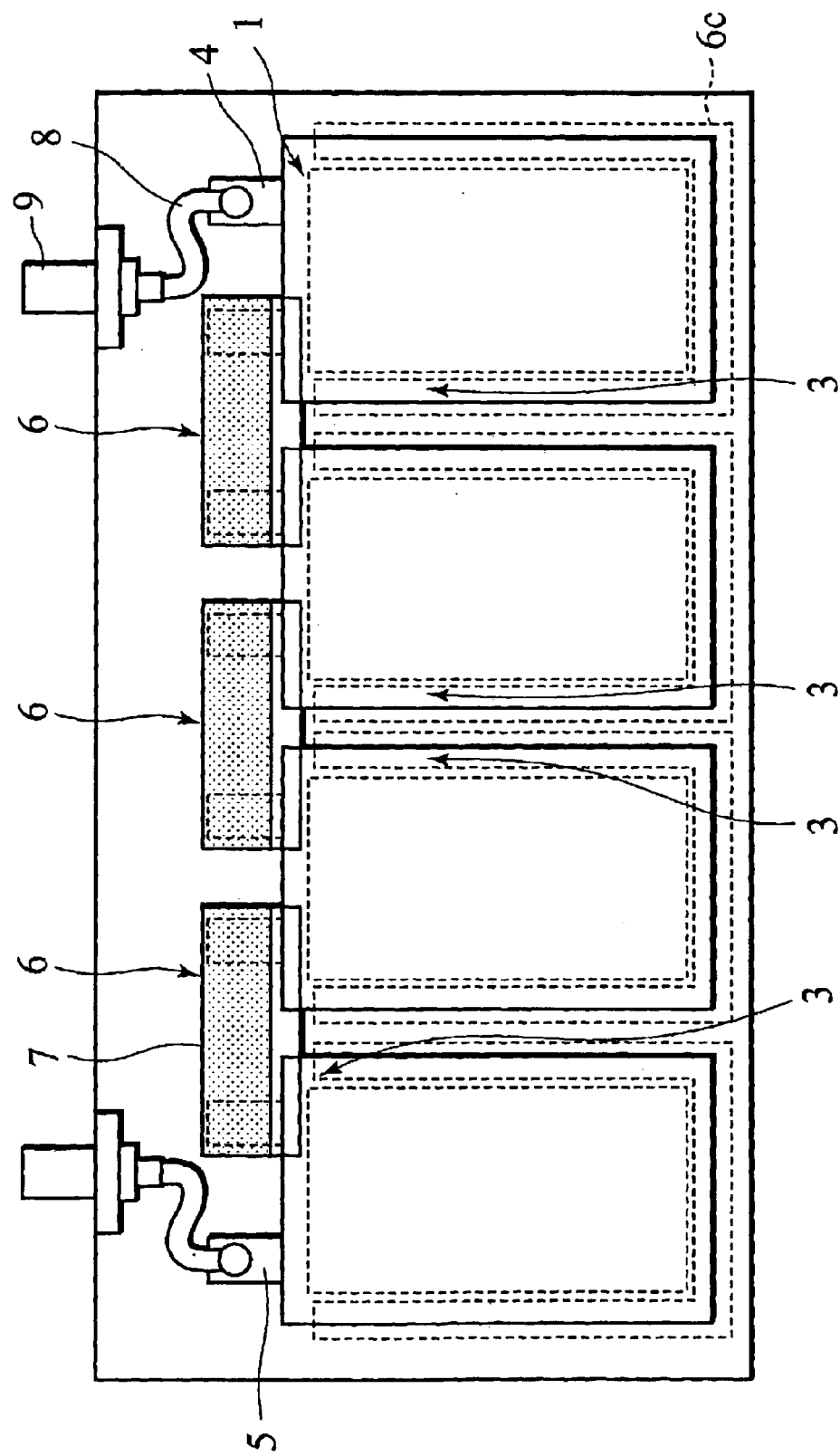
FIG. 7 is a schematic view showing internal parts of the battery module of Embodiment 3, as viewed from its front side.
Figure 8:
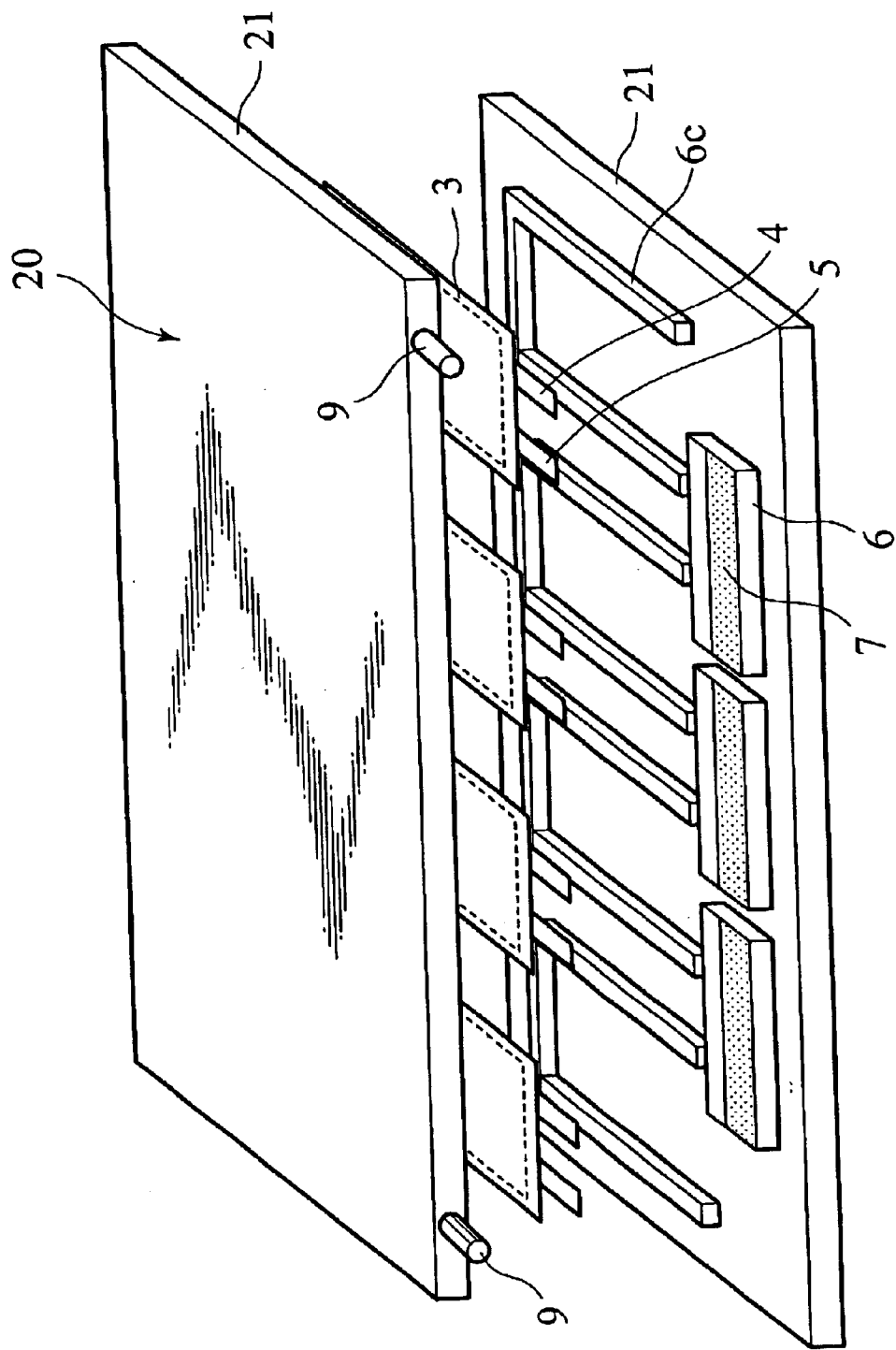
FIG. 8 is a dismantled perspective view showing the battery module of Embodiment 3.

Since the fundamental structure of Embodiment 3 is similar to that of Embodiment 1, only the differences therebetween will be described. As shown in FIGS. 7 and 8, fixing ribs 6c are provided so as to completely correspond to the positions where the thermally fused portions 3 serving as a junction part of the cell outer case are arranged, except for the side where the electrode lead terminals 4 and 5 are provided.

Next, the functions will be described.

The presence of the fixing ribs 6c facilitates the positioning of the single cells upon modularization, thereby improving the assemblability. A gap may be provided for part of the fixing ribs 6c. By means of such a gap, even when the internal pressure is increased due to increase in battery temperature, the internal pressure of the battery can be released from the above gap.

Hereinafter, the present invention will be described based on specific examples. However, the present invention is not limited to these examples, and it is possible to appropriately alter the examples for implementation as long as the scope of the present invention is not changed.

EXAMPLE 1

The battery module of Embodiment 1, in which the flat cells are interposed from both sides, was used. Plates made of an acrylic resin, each having a thickness of 10 mm, were used as the plates for interposing the flat cells therebetween. The battery module had such a structure that the lead terminals of the cells and the thermally fused portions between the lead terminals and the cells were interposed between the plates.

Moreover, rib-shaped protrusions were placed so as to connect the lead terminals of the cells adjacent to each other. Then, electrical conductors allowing a current to flow through the rib-shaped protrusions were provided. For each of the electrical conductors, copper having a thickness of 1 mm was used. In order to enhance the electrical contact more reliably, the setting portions for the electrical conductors were formed higher than the rib-shaped protrusions by 200 µm, as shown in FIG. 4. The connection between the lead terminals of the cells and the terminals of the battery module was realized with lead wirings, each having a diameter of 8 mm, and screws as shown in FIG. 5.

EXAMPLE 2

Similarly to Embodiment 3, the battery module was made to have such a structure that even the thermally fused portions at the outer peripheries of the cells where no electrode lead terminal was provided were pressed. The remaining structure was the same as in Example 1.

For each of the examples, a favorable battery module could be obtained.

As is apparent from the above description, the battery module of the present invention has enhanced reliability for the sealability of the cells and facilitated connection between the cells so as to ensure the charge/discharge performance at a high current in the cell using a laminate film as a cell outer case. Accordingly, the battery module of the present invention has great industrial value.

Moreover, the battery module serves as an electric power source for an electric vehicle, a hybrid car and a fuel cell vehicle, or as a 12V or 42V battery for a vehicle, thus providing a highly reliable electric vehicle, hybrid car, fuel cell vehicle and general vehicle.

The entire content of a Japanese Patent Application No. P2002-34928 with a filing date of Feb. 13, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A battery module, comprising:
   a flat cell comprising: a laminate film constituted by a polymer-metal composite, the laminate film being a cell outer case; an electric power generating element formed by stacking or winding a positive electrode plate, a separator and a negative electrode plate; lead terminals for flowing and receiving current to/from the electric power generating element; a cell outer case junction part formed by partially or completely covering the electric power generating element with the laminate film, and by sealing the laminate film by thermal fusion;
   a cell assembly formed by collecting a plurality of the flat cells; and
   a pair of planar supports for interposing the cell assembly from a direction opposed to planes of the flat cells;
   wherein rib-shaped protrusions respectively including electrical conductors for electrically connecting the lead terminals of a plurality of the flat cells are provided on at least one of the planar supports, the rib-shaped protrusions being held on the planar support at predetermined intervals, and the planar supports pressing and supporting the cell assembly.

2. The battery module of claim 1,
   wherein a predetermined distance is held between the electrical conductor and the cell outer case junction part.

3. The battery module of claim 1,
   wherein a setting portion for the electrical conductor of each of the rib-shaped protrusions is formed so as to be projected toward the lead terminals beyond a portion for pressing the cell outer case junction part.

4. The battery module of claim 1, further comprising:
   second ribs for pressing the lead terminals against the electrical conductors, the second ribs being provided on the other planar supports at positions opposed to the rib-shaped protrusions which include the electrical conductors.

5. The battery module of claim 1, further comprising:
   fixing ribs partially or entirely provided on positions where the cell outer case junction part is placed except for a side where the lead terminals are provided.

* * * * *